United States Patent
Harris

(10) Patent No.: US 9,870,094 B2
(45) Date of Patent: Jan. 16, 2018

(54) TOUCH SENSITIVE DEVICE

(75) Inventor: Neil John Harris, Cambourne (GB)

(73) Assignee: NVF Tech Ltd., Cambridgeshire (GB)

( * ) Notice: Subject to any disclaimer, the term of this patent is extended or adjusted under 35 U.S.C. 154(b) by 161 days.

(21) Appl. No.: 13/258,906

(22) PCT Filed: Mar. 30, 2010

(86) PCT No.: PCT/GB2010/050540
§ 371 (c)(1),
(2), (4) Date: Nov. 16, 2011

(87) PCT Pub. No.: WO2010/116163
PCT Pub. Date: Oct. 14, 2010

(65) Prior Publication Data
US 2012/0050230 A1    Mar. 1, 2012

(30) Foreign Application Priority Data

Apr. 9, 2009  (GB) ................................. 0906138.3
Jul. 22, 2009  (GB) ................................. 0912740.8

(51) Int. Cl.
*G06F 3/041* (2006.01)
*G06F 3/033* (2013.01)
*G06F 3/043* (2006.01)

(52) U.S. Cl.
CPC .......... *G06F 3/0418* (2013.01); *G06F 3/0433* (2013.01)

(58) Field of Classification Search
CPC ............................. G06F 3/0418; G06F 3/0433
USPC ........................................................ 345/178
See application file for complete search history.

(56) References Cited

U.S. PATENT DOCUMENTS

| | | | |
|---|---|---|---|
| 4,710,758 A * | 12/1987 | Mussler et al. ............... | 345/178 |
| 6,246,394 B1 * | 6/2001 | Kalthoff et al. .............. | 345/173 |
| 7,277,087 B2 * | 10/2007 | Hill et al. ..................... | 345/173 |
| 7,411,581 B2 * | 8/2008 | Hardie-Bick ................. | 345/173 |
| 7,515,138 B2 * | 4/2009 | Sullivan ........................ | 345/173 |
| 7,944,435 B2 * | 5/2011 | Rosenberg ............. | A63F 13/06 |
| | | | 345/173 |
| 8,830,211 B2 * | 9/2014 | Hill ....................... | G06F 3/0433 |
| | | | 178/18.04 |
| 2001/0006006 A1 * | 7/2001 | Hill ................................ | 73/606 |
| 2002/0050983 A1 * | 5/2002 | Liu et al. ...................... | 345/173 |
| 2002/0075135 A1 | 6/2002 | Bown | |

(Continued)

FOREIGN PATENT DOCUMENTS

EP    1 645 947    4/2006
EP    1 852 772    11/2007

(Continued)

*Primary Examiner* — Benyam Ketema
(74) *Attorney, Agent, or Firm* — Fish & Richardson P.C.

(57) ABSTRACT

A method of calibrating a touch sensitive device comprising a touch-sensitive screen; a plurality of transducers mounted to the screen and a processor, the method comprising inputting a signal into the screen at a test position on the screen whereby the screen is excited into vibration; detecting vibration in the screen using the plurality of transducers; and processing, in the processor of the touch-sensitive device, the detected vibration to generate an output signal for each of the plurality of transducers whereby when the transducers are driven by the output signals the screen is excited to generate a desired haptics sensation at the test position.

22 Claims, 9 Drawing Sheets

(56) References Cited

U.S. PATENT DOCUMENTS

| | | | |
|---|---|---|---|
| 2002/0149561 A1* | 10/2002 | Fukumoto | G01C 21/3664 345/156 |
| 2003/0217873 A1* | 11/2003 | Paradiso et al. | 178/18.04 |
| 2005/0146513 A1* | 7/2005 | Hill | G06F 3/0436 345/173 |
| 2006/0244732 A1* | 11/2006 | Geaghan | 345/173 |
| 2007/0103449 A1* | 5/2007 | Laitinen et al. | 345/173 |
| 2009/0284485 A1* | 11/2009 | Colgate | G06F 3/016 345/173 |
| 2009/0295739 A1* | 12/2009 | Nagara | G06F 3/016 345/173 |
| 2010/0013783 A1* | 1/2010 | St. Pierre | G06F 3/043 345/173 |
| 2010/0156818 A1* | 6/2010 | Burrough | G06F 3/016 345/173 |
| 2010/0309141 A1* | 12/2010 | Cruz-Hernandez | G06F 3/016 345/173 |

FOREIGN PATENT DOCUMENTS

| | | |
|---|---|---|
| KR | 1020070006725 A | 11/2007 |
| WO | 2005066756 | 7/2005 |

* cited by examiner

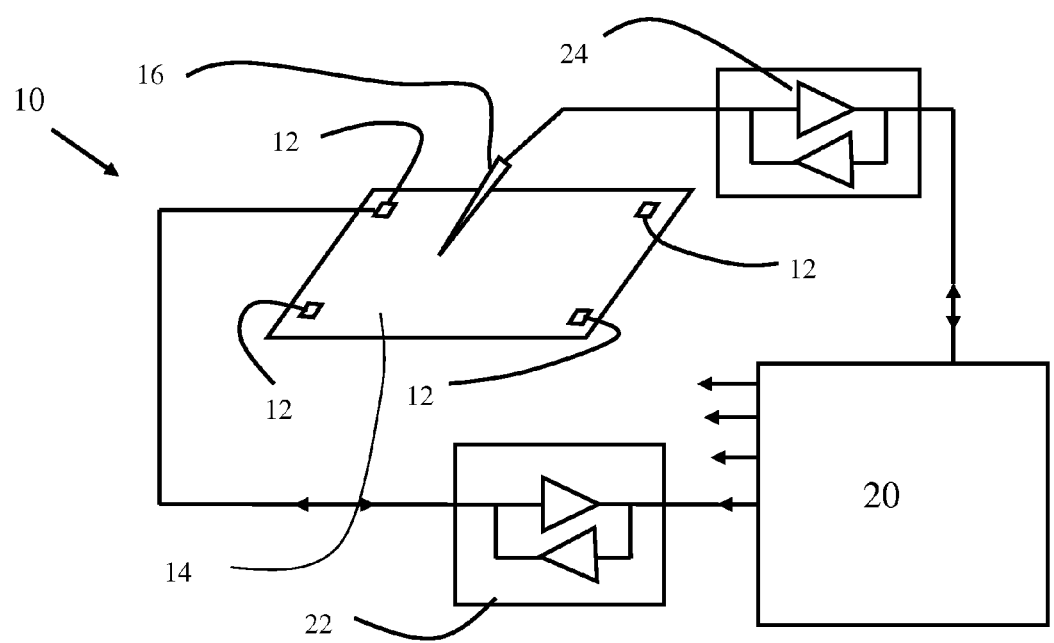
Fig 1
Fig 2a
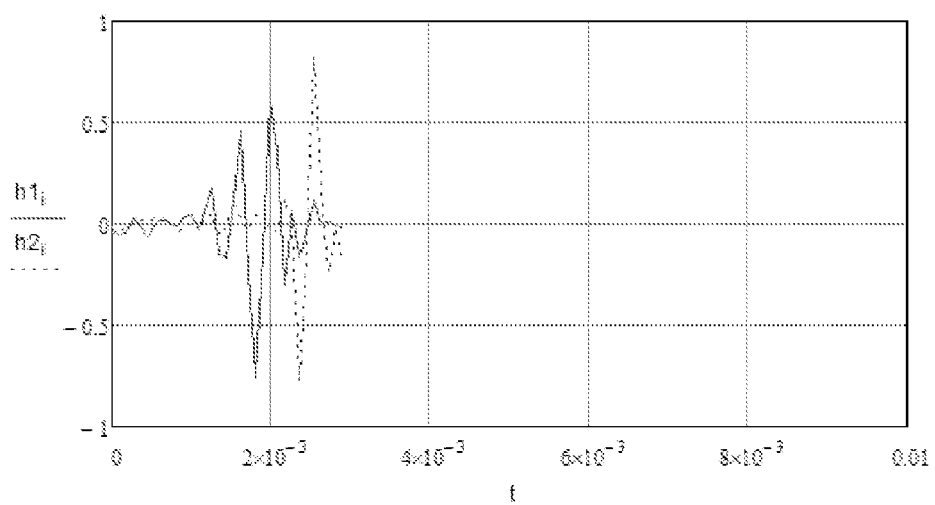

— sum (in-phase)
····· difference

TOUCH SENSITIVE DEVICE

TECHNICAL FIELD

The invention relates to touch sensitive devices including touch sensitive screens or panels.

BACKGROUND ART

U.S. Pat. No. 4,885,565, U.S. Pat. No. 5,638,060, U.S. Pat. No. 5,977,867, US2002/0075135 describe touch-operated apparatus having tactile feedback for a user when touched. In U.S. Pat. No. 4,885,565 an actuator is provided for imparting motion to the CRT when the actuator is energised to provide tactile feedback. In U.S. Pat. No. 5,638,060, a voltage is applied to a piezo-electric element which forms a switch to vibrate the element to apply a reaction force to a user's finger. In U.S. Pat. No. 5,977,867, a tactile feedback unit generates a mechanical vibration sensed by the user when the touch screen is touched with a finger or a pointer. The amplitude, vibration frequency and pulse length of the mechanical vibration are controlled, with the pulse width being long enough to be felt but short enough to terminate before the next key touch. US2002/0075135 describes the use of a second transducer to provide a pulse in the form of transient spike to simulate a button click.

In each of the prior art documents described above, tactile feedback is provided in response to a discrete touch, of a user's finger or pointer.

DISCLOSURE OF INVENTION

According to a first aspect of the invention, there is provided a touch sensitive device configured to operate in a use mode or a calibration mode, the device comprising
  a touch-sensitive screen;
  a plurality of transducers mounted to the screen wherein the plurality of transducers are configured, when the device is operating in use mode, to generate an output signal which excites the screen and wherein the plurality of transducer are configured, in calibration mode, to detect vibration in the screen generated by an input signal from a vibration generator contacting the screen at a test position, and
  a processor coupled to the multiple transducers whereby the processor is configured to process the detected vibration to generate an output signal for each of the plurality of transducers in sensing mode whereby, in use mode, the plurality of transducers excite the screen to produce a desired haptics sensation to a user contacting the screen at the test position.

The vibration generator may be in the form of a vibrating stylus.

According to another aspect of the invention, there is provided a method of calibrating a touch sensitive device comprising a touch-sensitive screen; a plurality of transducers mounted to the screen and a processor, the method comprising
  inputting a signal into the screen at a test position on the screen whereby the screen is excited into vibration;
  detecting vibration in the screen using the plurality of transducers; and
  processing the detected vibration to generate an output signal for each of the plurality of transducers whereby when the transducers are driven by the output signals the screen is excited into generation of a desired haptics sensation at the test position.

The vibration in the screen may be generated by a vibrating stylus.

In this way, the touch sensitive device may be self-calibrating, i.e. able to teach itself. This alleviates the need to calculate the signals (particularly the transfer functions) to be fed to each transducer to generate the desired haptic sensation. Calculating the transfer functions is systematic and mathematically exact. However, the calculation process may be laborious, particularly for complex systems which provide haptics sensations simultaneously at more than one location on the screen (i.e. multi-region haptics).

The plurality of transducers may be reciprocal transducers. In this way, the device may take advantage of reciprocity. The general principle of reciprocity may be stated as "if a flow response is caused at an observation point by a potential acting at a source point, the relationship between flow and potential is unchanged if the role of the two points is inversed". The principle is applied to electromagnetism (Lorentz reciprocity), electrostatics (Green's reciprocity), antenna design and acoustics (Rayleigh-Carson reciprocity theorem). In the present application, reciprocity means that the transfer function from voltage at a transducer to velocity at a test point is the same as the transfer function from force at the test point to current at the transducer. Measuring the velocity at the test point is difficult but measuring the current from a transducer is straightforward.

Some transducers may be non reciprocal or may be partly or wholly reciprocal. If the plurality of transducers are not wholly reciprocal, there is still a known relationship between the forward and inverse transfer functions. Accordingly, the detected vibration may still be used to determine the output signal. However, the process is less straightforward.

The detected vibration may be processed to determine (i.e. by measurement) a transfer function of the input signal, i.e. a function which measures the transfer of force applied at the test position to each transducer. The processing may further comprise inferring the inverse of this transfer function, i.e. the transfer function necessary to produce a pure impulse at the test position from each transducer.

The inferring step may be by direct calculation so that measurement of the transfer function $H(f)$ is followed by inversion to obtain $H^{-1}(f)$. Alternatively, the inferring step may be indirect, e.g. using feedback adaptive filter techniques to implicitly invert $H(f)$. Alternatively, the inferring step may be heuristic, e.g. using parametric equalisation processing, and adjusting the parameters to estimate the inverse transfer function.

Alternatively, the inferring step may be approximated by reversing the measured time responses, which in the frequency domain is equivalent to complex conjugation, thus generating the matched filter response $\overline{H(f)}$ In this case, the result of applying the filter is not a pure impulse, but the autocorrelation function.

The resulting inverse transfer functions may be stored for later use by the device, for example in a transfer function matrix with the inverse transfer function for each of the plurality of transducers stored at an associated coordinate in the matrix. The spatial resolution of the transfer function matrix may be increased by interpolating between the calibration test points.

The time-reversed responses may be generated by adding a fixed delay which is at least as long as the duration of the detected signal. The fixed delay may be at least 5 ms, at least 7.5 ms or at least 10 ms. The measured time response may be normalised before filtering, e.g. by dividing by the sum of all measured responses in the frequency domain and then transforming into the time domain, to render the response more spectrally white.

Thus, according to another aspect of the invention, there is provided a method of calibrating a touch sensitive device comprising a touch-sensitive screen; a plurality of vibration transducers coupled to the screen, and a signal processor, the arrangement being such that at least some of the plurality of transducers provide haptic feedback to the screen in response to touch, the method comprising inputting a vibrational signal into the screen at a test position on the screen whereby the screen is excited into vibration;

detecting vibration in the screen using signals from the plurality of transducers in response to the vibrational signal;

measuring, in the signal processor the detected signals to generate an output signal for each of the plurality of transducers whereby the transducers are driven by the output signals to excite the screen to generate a desired haptics sensation at the test position, and wherein the output signals are generated by filtering the detected signals by using time inverted copies of the detected signals.

The time inverted copies may include a fixed delay which is at least as long as the duration of the detected signal. The fixed delay may be at least 5 ms, at least 7.5 ms or at least 10 ms. The detected vibration at each transducer may be normalised before filtering, e.g. by dividing by the sum of all measured responses in the frequency domain and then transforming into the time domain, to render the response more spectrally white.

The desired haptic sensation may be a maximum response at a given test point. Thus, the output signals for each transducer may be in-phase with each other, whereby all the displacements generated by the transducers add up to the maximum displacement at the given test point. It is noted, that at other test points, there may be phase cancellation.

Alternatively, the desired haptic sensation may be a minimum response at a given test point. Thus, the output signals for each transducer may be selected so that the displacements provided at the test position (i.e. so that the appropriate transfer functions) sum to zero. With two transducers, this is achieved by inverting one output signal relative to the other.

The desired haptic sensation may be a maximum at a first test point and a minimum at a second test point. Alternatively, the desired haptic sensation may be a response which is between the minimum or maximum at a given test position, for example, where the responses at multiple test positions are to be taken into account.

The desired haptic sensation may provide the sensation of a button click to a user. Alternatively, a complex haptic signal (in terms of produced displacement and/or acceleration) may be generated to provide additional information to the user. The haptic feedback signal may be associated with a user action or gesture etc. Alternatively, or additionally, the haptic signal may be associated with the response of the touch-sensitive surface in terms of display action or reaction.

The output (i.e. carrier wave) signal may be a sine wave at a single frequency. Alternatively, the carrier wave signal may comprise multiple sine waves covering a range of frequencies or may be a swept (chirp), or may be an FM modulated sine wave or a band-limited noise signal, or the carrier may be modulated by band limited noise.

The touch-sensitive screen may be vibrated by applying a signal comprising multiple pulses or a stream of pulses.

The vibration may include any type of vibration, including bending wave vibration, more specifically resonant bending wave vibration.

The vibration exciter may comprise means for applying a bending wave vibration to the screen face. The vibration exciter may be electro-mechanical.

The exciter may be an electromagnetic exciter. Such exciters are well known in the art e.g. from WO97/09859, WO98/34320 and WO99/13684, belonging to the applicant and incorporated herein by reference. Alternatively, the exciter may be a piezoelectric transducer, a magneto-strictive exciter or a bender or torsional transducer (e.g. of the type taught in WO 00/13464). The exciter may be a distributed mode actuator, as described in WO01/54450, incorporated herein by reference. A plurality of exciters (perhaps of different types) may be selected to operate in a co-ordinated fashion. The or each exciter may be inertial.

The touch surface may be a panel-form member which is a bending wave device, for example, a resonant bending wave device. The touch screen may also be a loudspeaker wherein a second vibration exciter excites vibration which produces an acoustic output. Alternatively, one of the exciters used to provide haptic feedback may also be used to provide an audio signal to drive the touch screen as a loudspeaker. For example, the touch screen may be a resonant bending wave mode loudspeaker as described in International Patent Application WO97/09842 which is incorporated by reference.

Contact on the surface may be detected and/or tracked as described in International patent applications WO 01/48684, WO 03/005292 and/or WO 04/053781 to the present applicant. These International patent applications are here incorporated by reference. Alternatively, other known methods may be used to receive and record or sense such contacts.

The invention further provides processor control code to implement the above-described methods, in particular on a data carrier such as a disk, CD- or DVD-ROM, programmed memory such as read-only memory (firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very High speed integrated circuit Hardware Description Language). As the skilled person will appreciate such code and/or data may be distributed between a plurality of coupled components in communication with one another.

BRIEF DESCRIPTION OF DRAWINGS

The invention is diagrammatically illustrated, by way of example, in the accompanying drawings in which:—

FIG. 1 is a schematic illustration of a touch sensitive device;

FIG. 2a shows the time reversal filtered impulse responses in the time taken for the responses to travel from dissimilar positions from a test point to a sensor;

FIGS. 5a to 5d show the impulse response as it varies with time for each of the signal of FIG. 4a;

DETAILED DESCRIPTION OF DRAWINGS

Figure 2B:
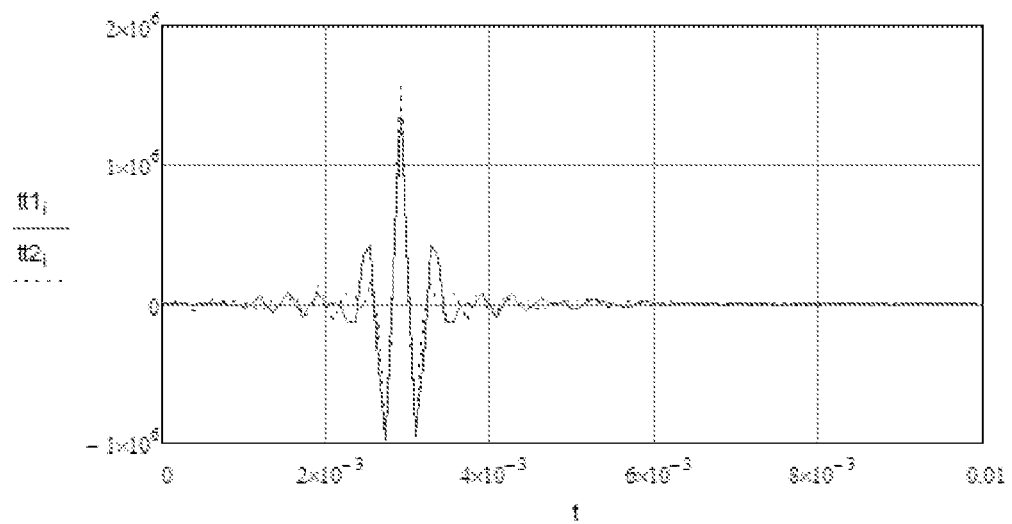
FIG. 2b shows the variation in time of the input impulse responses of FIG. 2a after filtering by the matched inversed input response.

FIG. 1 shows a touch-sensitive haptics device 10 with four haptics-input vibration transducers 12 mounted to a touch-sensitive screen 14 (there may be any number of input transducers on the screen). The transducers 12 are each coupled to a system processor 20 via a two-way amplifier 22. A stylus 16 is also connected to the processor 20 via a two-way amplifier 24.

The touch-sensitive device has two operational modes, normal use and training mode. In normal use, i.e. when a user is using the screen 14 of the touch-sensitive device 10, the transducers 12 produce the required localized haptic force feedback in response to detected touches on the surface. The method of producing the haptic feedback is not critical to the operation of the device and may be as described in any known techniques. The haptic sensation may be a click to simulate the feel of pressing a button or may be more complex to simulate other sensations, i.e. associated with sliding movements, increasing/decreasing intensity of feeling etc. The more complex sensations may be associated with gestures such as sliding, pitching or rotating fingers on the screen.

In training mode, the stylus 16 is used to inject vibrational signals at specified test points; thus the stylus 16 may be considered to be a "force pencil". The transducers 12 are used as sensors to detect these input signals. The transducers are thus reciprocal transducers able to work as both output devices to generate excitation signals which create vibration in the screen and as input devices to sense vibration in the screen and convert the vibration into signals to be analysed. It is preferable for all the transducer to be reciprocal devices but it is possible to have a device in which not all transducers are reciprocal; such a device is more complicated.

The system processor 20 generates the signals which are sent to the stylus 16 via the two-way amplifier 24 and receives the signals from the transducers 12. The two-way amplifiers 22 are also connected between the system processor 20 and each transducer 12; one amplifier for each channel, i.e. one amplifier for each transducer. The stylus 16 is also arranged to sense haptic feedback signals in the screen originating from the transducers 12 and to feed the sensed signals to the processor 20 via the two-way amplifier 24.

FIG. 2a shows the variation in time of a time reversal filtered impulse response which is input to the system by the stylus 16 at a test point on the touch sensitive screen and measured at two transducers which are differently spaced from the test point. Both signals are have a sinusoidal nature with amplitude increasing, then decreasing, with time. The first signal $h1_i$ shows the signal received at the first transducer. The first signal has a negative peak amplitude at approximately 0.0018 s and a positive peak at approximately 0.002 s. The second signal $h2_i$ (as received at the second transducer) has negative and positive peaks in amplitude approximately 0.0005 s after the first signal. The signals reach the location of the transducers at approximately 0.003 s.

FIG. 2b plots the output signals for each transducer which are the results of filtering the input responses of FIG. 2b. The input responses are filtered by matched filters which are created by the system processor 20 by inverting the impulse responses. In other words, first filtered signal $tt1_i$ is created by filtering first input signal $h1_i$ using the inverted input signal $h1_i$. Similarly second filtered signal $tt2_i$ is created by filtering second input signal $h2_i$ using the inverted input signal $h2_i$. As shown in FIG. 2b the output signals are generally consistent, i.e. are in phase with similar amplitudes. Both signals have a maximum (positive) amplitude at approximately 0.003 s. Thus, if the appropriate output signal was applied to each the transducer to excite the screen, these output signals would both have a maximum output at the test point.

Figure 2C:
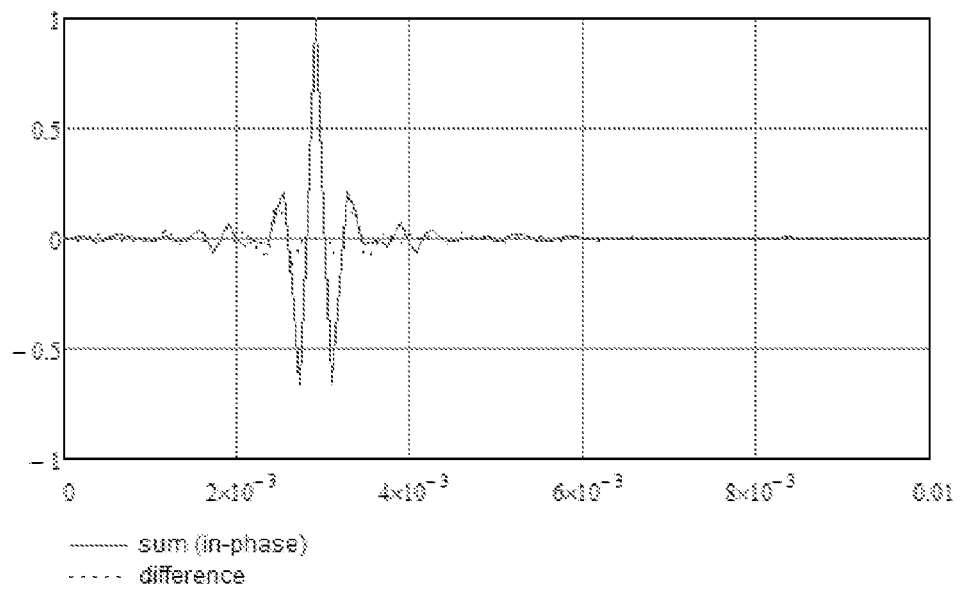
FIG. 2c shows the sum and difference combinations for the normalized outputs of FIG. 2b.

FIG. 2c. plots the results of combined the outputs of the matched filters in-phase or out-of-phase. The sum of the normalized matched filter responses (i.e. in-phase combination) reinforces the signal at the test point and the difference of the normalized matched filter responses (i.e. out-of-phase combination) results in cancellation at 0.003 s, i.e. at the test point.

Figure 3A:
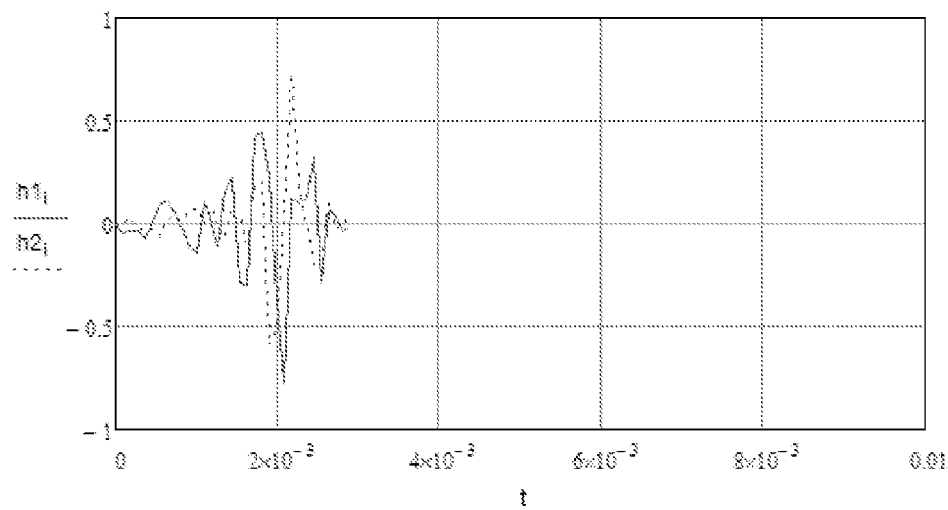
FIG. 3a shows the variation for two input time reversal filtered impulse responses in the time taken for the responses from similar positions to travel from a test point to a sensor.
Figure 3B:
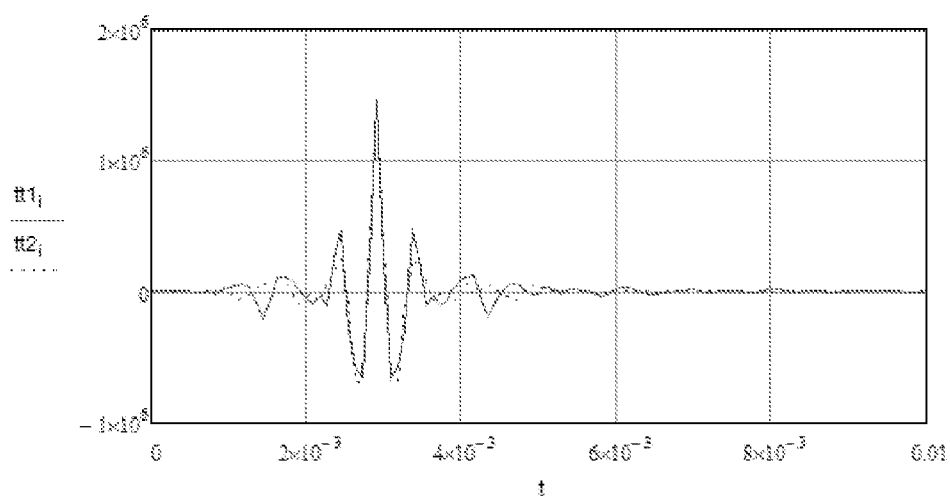
FIG. 3b shows the variation in time of the input impulse responses of FIG. 3a after filtering by the matched inversed input response.
Figure 3C:
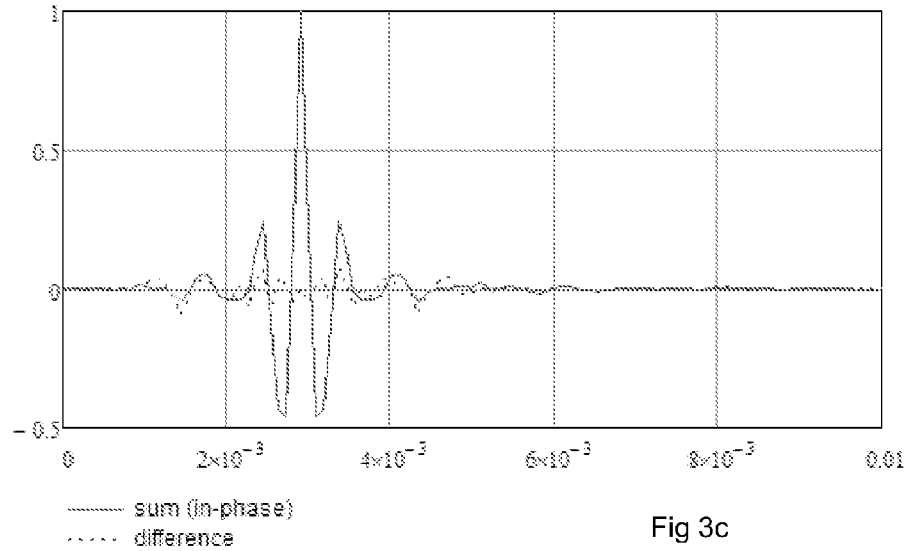
FIG. 3c shows the sum and difference combinations for the normalized outputs of FIG. 3b.

FIGS. 3a to 3c are generally similar to those of FIGS. 2a to 2c except that the transducers measuring the input signals are equidistant from the test position. The first input signal $h1_i$ measured by the first transducer has a negative peak amplitude at approximately 0.002 s and the second signal $h2_i$ measured by the second transducer has a positive peak amplitude at approximately the same time.

FIG. 3b plots the results of filtering the input responses of FIG. 3b. The input responses are filtered by matched filters which are created in the system processor 20 by inverting the impulse responses. In other words, first filtered signal $tt1_i$ is created by filtering first input signal $h1_i$ using the inverted input signal. Similarly second filtered signal $tt2_i$ is created by filtering second input signal $h2_i$ using the inverted input signal $h2_i$ As shown in FIG. 3b the filtered input (or output) signals are generally matched, i.e. are in phase with similar amplitudes. Both output signals have a maximum (positive) amplitude at approximately 0.003 s. Thus if the associated output signal was individually input to the associated transducer, the transducer would generate vibration in the screen having a maximum at the test point.

FIG. 3c. plots the results of combining the outputs of the matched filters in-phase or out-of-phase. If the transducers produce the sum of the normalized matched filter responses (i.e. in-phase combination), the resultant output reinforces the maximum amplitude at the test point. Conversely, the difference of the normalized matched filter responses (i.e.

out-of-phase combination) results in cancellation at the test point, i.e. no vibration is produced at the test point.

As explained above, in FIGS. 2a to 2c, the test position is differently spaced from the transducers, and in FIGS. 3a to 3c, the distances between each transducer and the test position are similar. The fact that both test position to sensor conditions work well illustrates that the time reversal method compensates for delay differences.

Figure 8A:
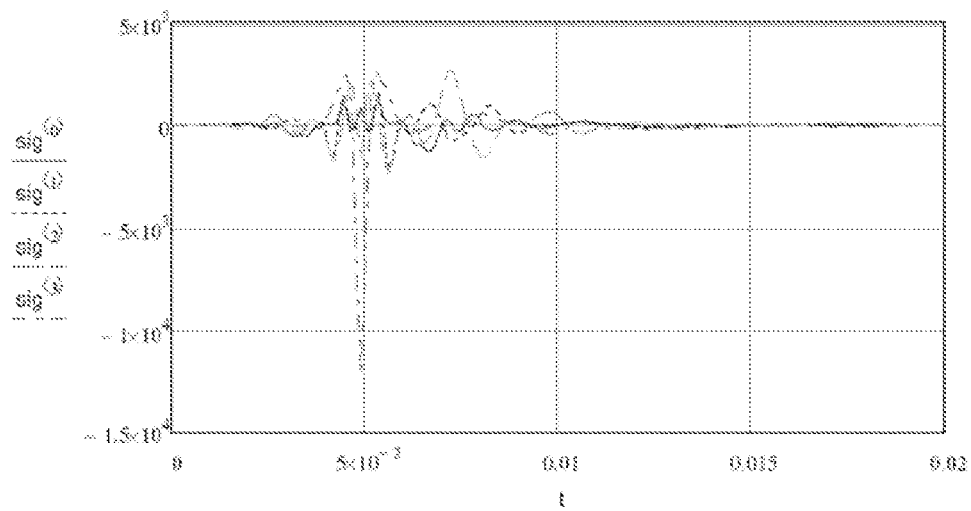
FIGS. 8a to 8c show a variation on the output signals of FIGS. 7a to 7c.
Figure 8B:
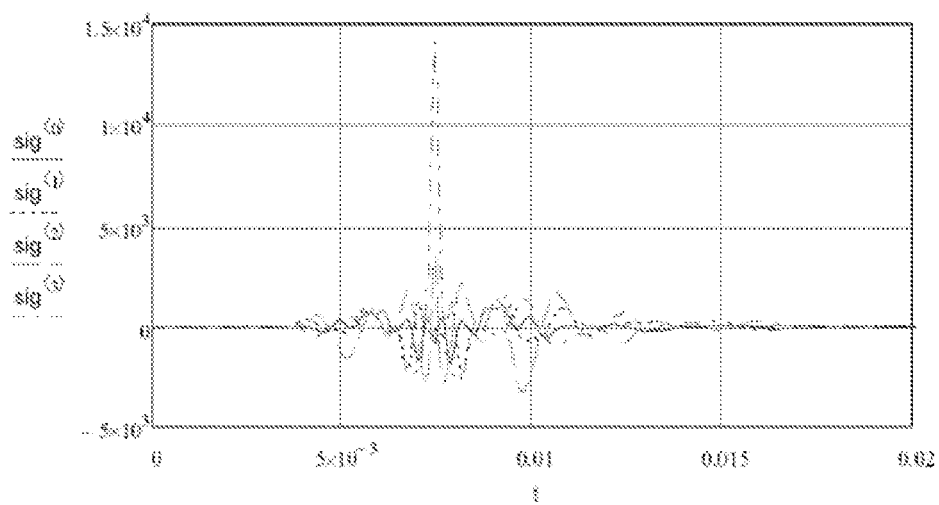
Figure 8C:
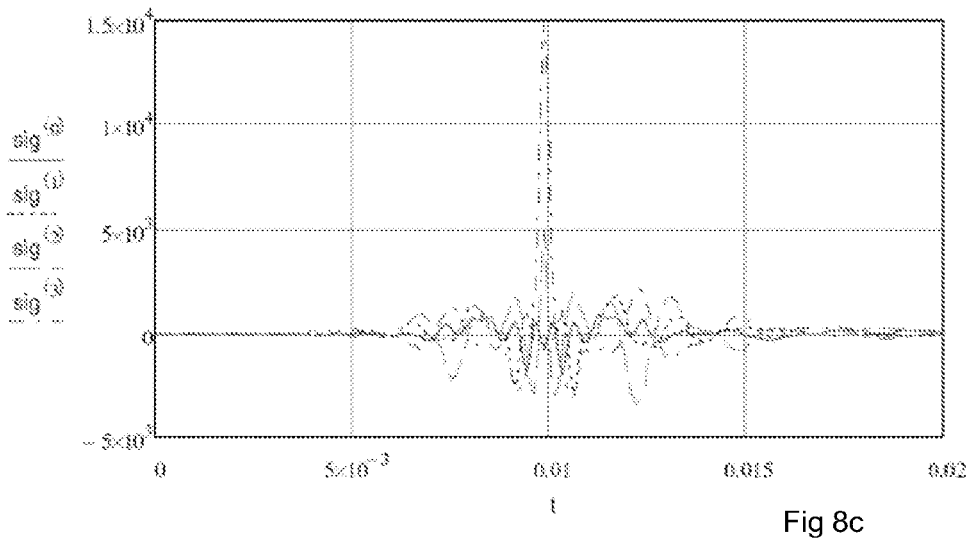
Figure 9:
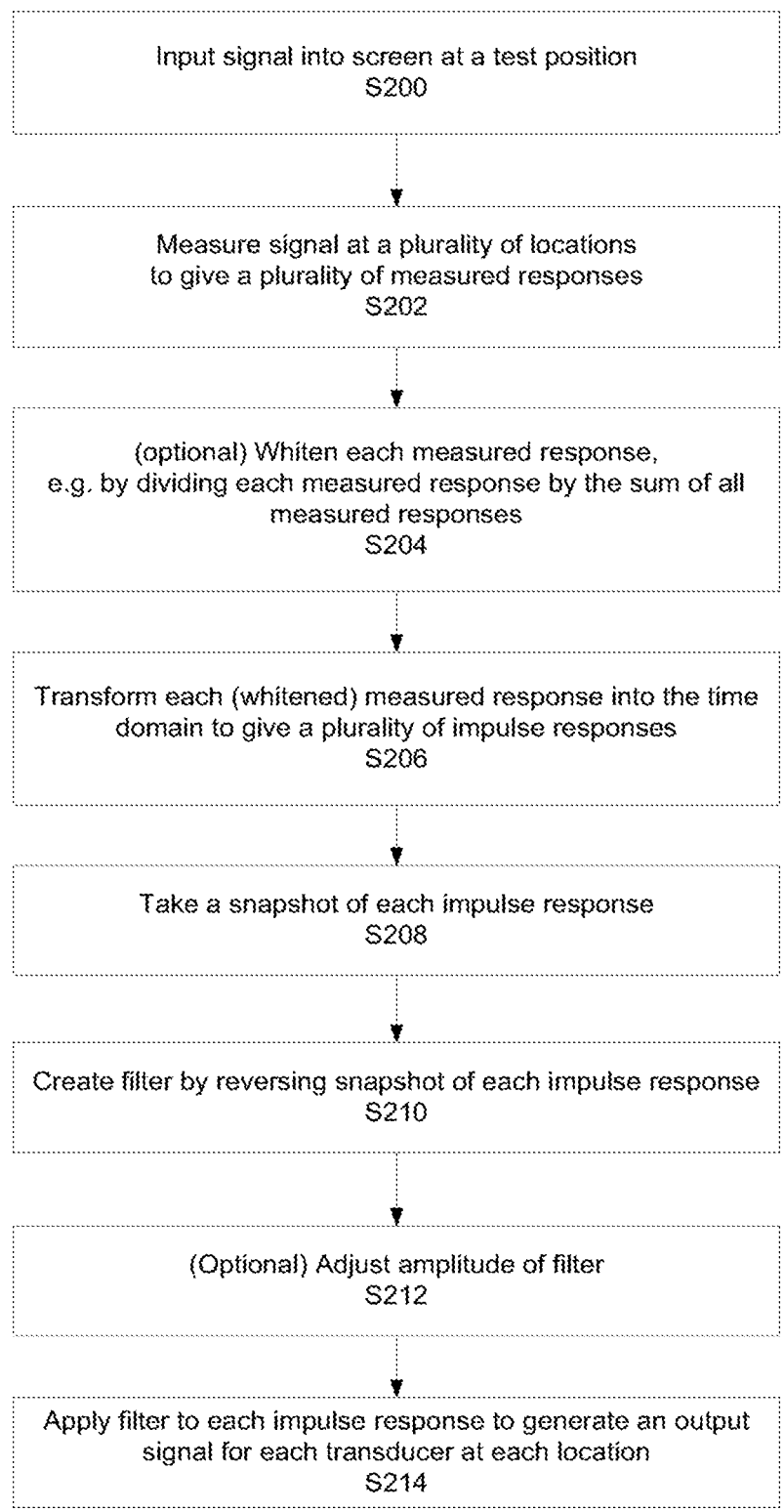
FIG. 9 is a flowchart of the method steps for FIGS. 4a to 8c.

FIGS. 4a to 9 illustrate an alternative method for creating a matched filter response using a time-reversed impulse response. As shown in FIG. 9, the first step S200 is to input a signal into the screen at a test positions and to measure this input signal at a plurality of locations (S202). As explained with reference to FIG. 4a, each measured response is optionally whitened (S204) and then transformed into the time domain (S206). As explained in FIGS. 5a to 5d, the filter is formed by taking a snapshot of each impulse response (S208) and reversing this snapshot (S210).

The spectrum of the time-reversed signal is the complex conjugate of the original original: $x(t) \rightarrow X(f)$ filter: $y(t)=x(-t); Y(f)=\text{conj}(X(f))$ This is approximated by adding a fixed delay, so $z(t)=x(T-t)$ if $t<=T$, or $z(t)=0$ if $t>T$ When the filter is applied to the signal (ignoring the approximation for now), the phase information is removed, but the amplitude information is reinforced.

$y(t)*x(t) \rightarrow X(f) \times Y(f) = |X(f)|^2$ (In fact, the resulting time response is the autocorrelation function).

As shown in step S212, the filter amplitude may adjusted as described with reference to FIGS. 7a to 8c. The filter is then applied to each impulse response to generate an output signal to be applied at each location (S214).

Figure 4A:
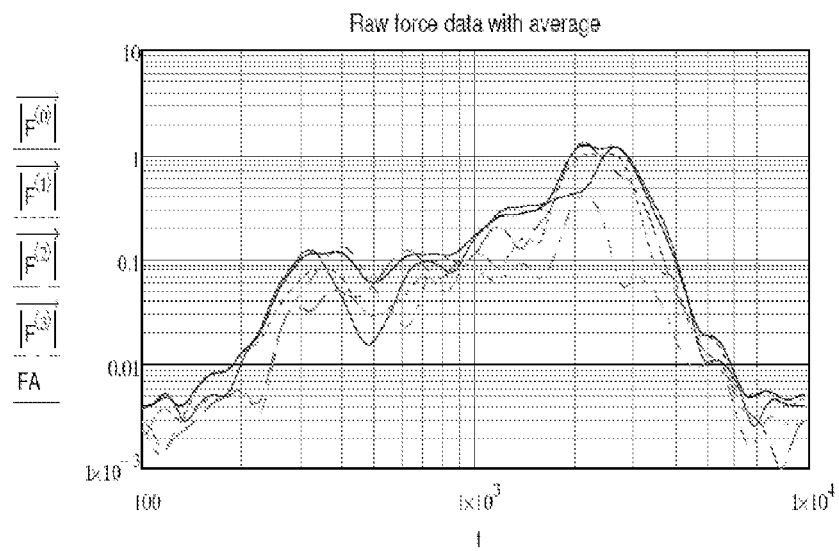
FIG. 4a shows a log-log plot of |force| vs frequency for each channel F and the arithmetic sum FA.
Figure 4B:
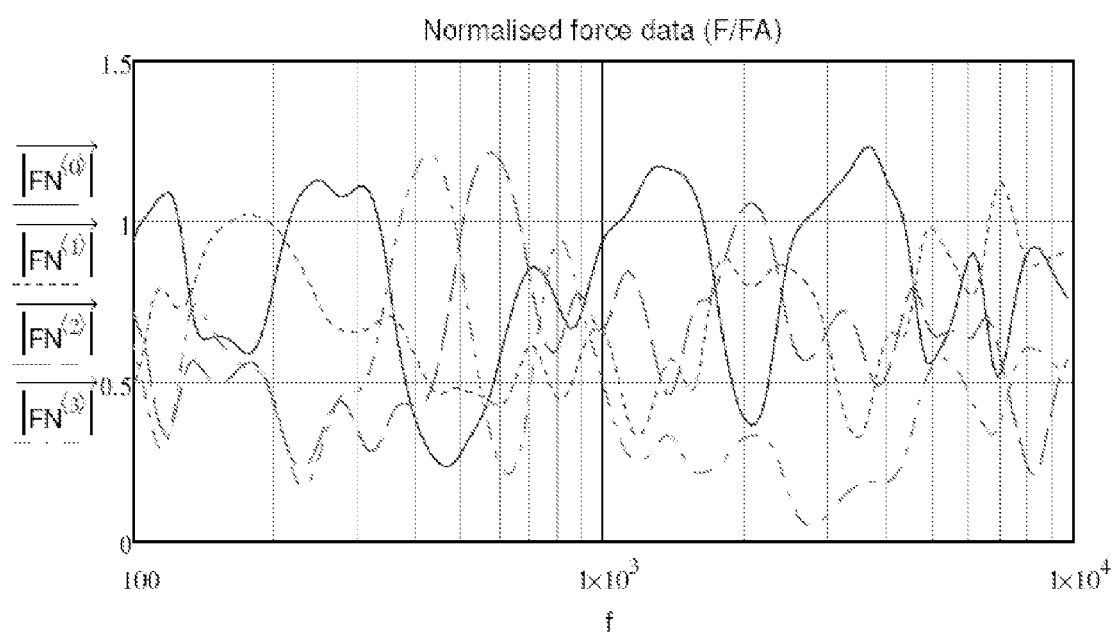
FIG. 4b shows a log-lin plot of each channel of FIG. 4a divided by FA (i.e. normalised)
Figure 5A:
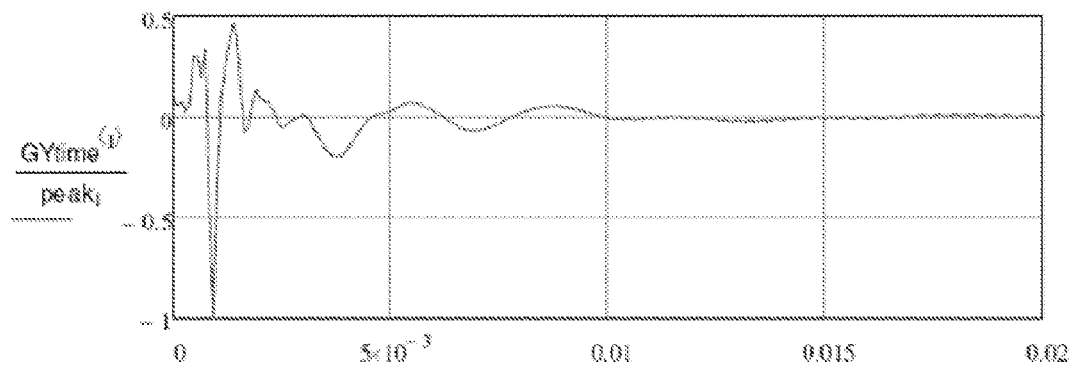
Figure 5B:
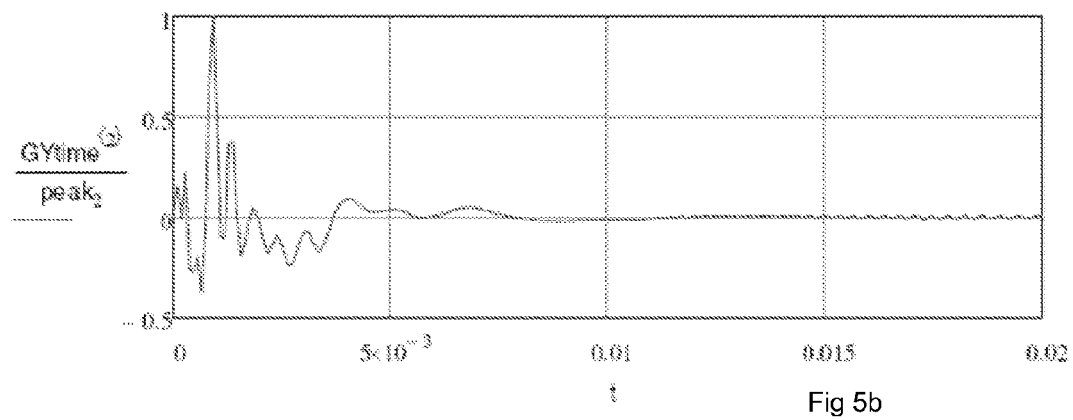
Figure 5C:
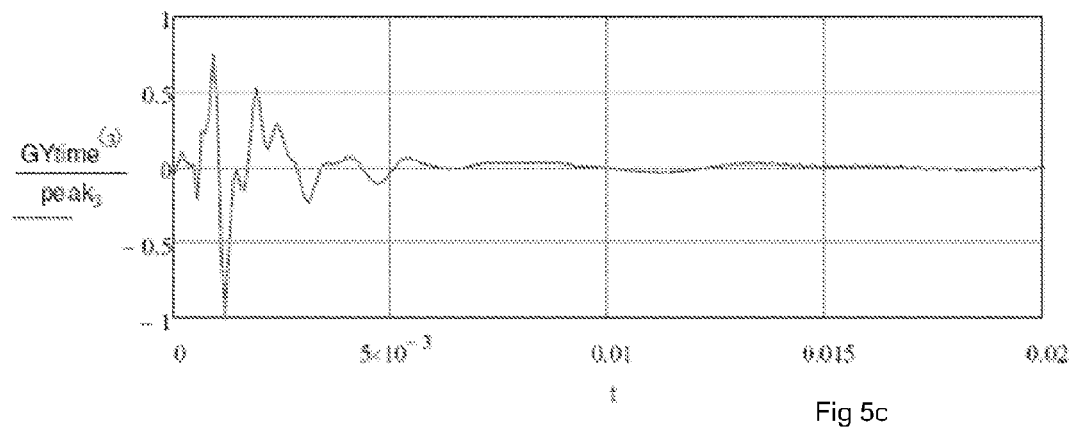
Figure 5D:
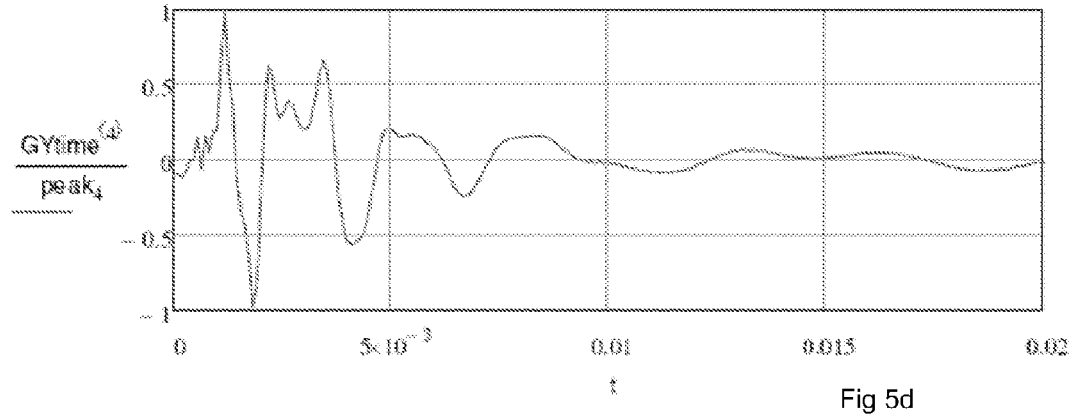

FIG. 4a is a log-log plot of |force| vs frequency for each channel (F) (i.e. for four haptics-input vibration transducers) and the arithmetic sum (FA) of these four forces. FIG. 4b is a log-lin plot of each of the 4 channel responses divided by FA (FN), i.e. normalised. Dividing each response by FA renders them more spectrally white, which improves the effectiveness of the method. This is because the amplitude response is squared in the filtering process and thus it is beneficial if the signal is spectrally "white", or flat.

FIGS. 5a to 5d show each of the four normalised responses transformed into the time domain to give the individual impulse responses (GYtime$^{<i>}$). These impulse responses have also been normalised by dividing by the peak for each response.

Figure 6A:
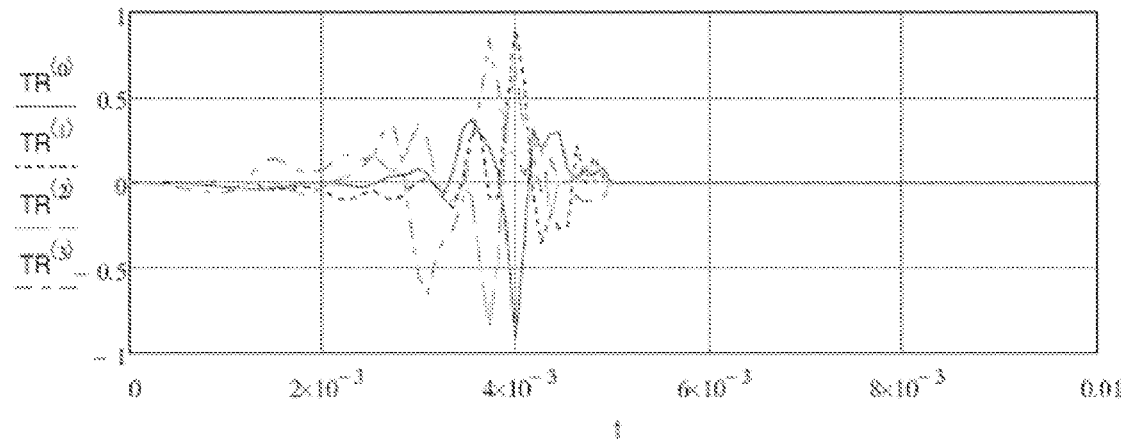
FIG. 6a shows the time reversal filters for each of FIGS. 5a to 5d.

The time reversal filters, TR, are formed by taking a finite snapshot of the impulse responses of FIGS. 5a to 5d and then reversing them in time. The TR have built into them a delay equal to the length of the sample. FIG. 6a shows the time reversal filter for each channel (0, 1, 2 and 3)

$$TR_{k,j} := \frac{\text{if } (k \geq kmax, 0, GYtime_{kmax-k-1,j+1} \cdot win_{kmax-k-1})}{peak_{j+1}}$$

where kmax=samples (length)

Figure 6B:
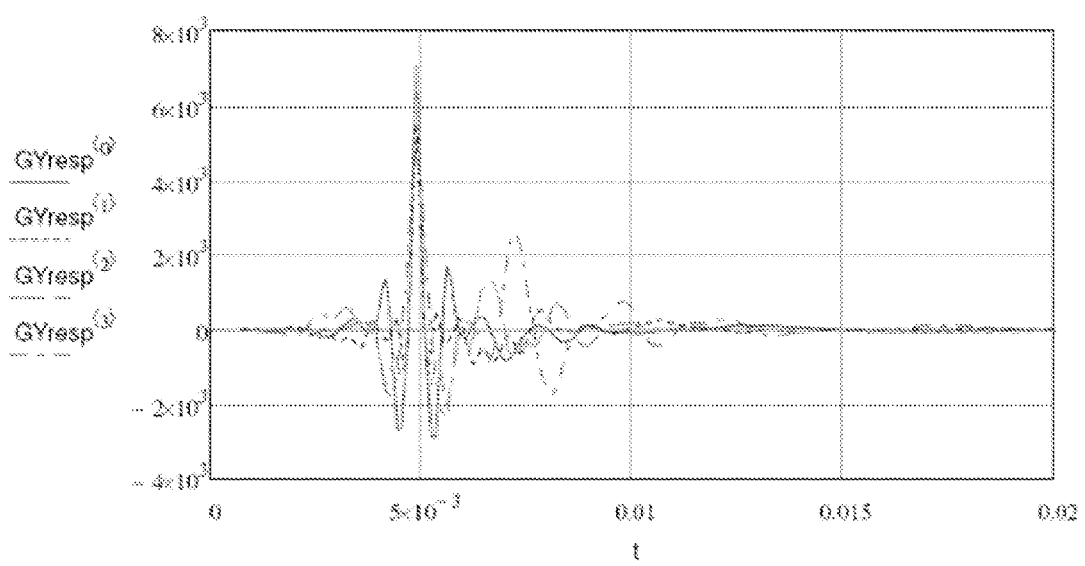
FIG. 6b shows the time reversal filters of FIG. 6a convolved with each respective signal of FIGS. 5a to 5d.

FIG. 6b shows the results of convolved the filters with the appropriate impulse responses in the time domain (GYtime) to give the filtered response GYresp. The convolution is expressed as:

$$GYresp_{k,j} := \sum_{i=0}^{k} (GYtime_{k-1,j+1} \cdot TR_{i,j})$$

$$amp_j := \max(GYresp^{(j)})$$

As shown in FIG. 6b, all the responses share a common maximum, but exhibit some ringing. The common maximum occurs because the phase/time information has been corrected. The ringing occurs because the amplitude information is exaggerated.

FIGS. 7a to 8c show how the filter amplitudes may be adjusted to maximise or minimise the sum of the four signals at the touch location. There are infinitely many ways of obtaining a zero sum because the system is under determined but there are only three linearly independent (orthogonal) normalised response sets. Any linear sum of these three sets will also produce a zero response. The normalised set for maximising the response is unique. Thus, with four signals, there may be three ways (sig. 0, sig. 1, sig. 2) of getting a 0 sum, and one way (sig. 3) of getting a maximum sum. This is reflected in the eigenvalues of the various matrices. It is noted that the eigenvectors are orthonormal, i.e. $E(i) \cdot E(j)=1$ if i=j, or 0 otherwise.

Figure 7A:
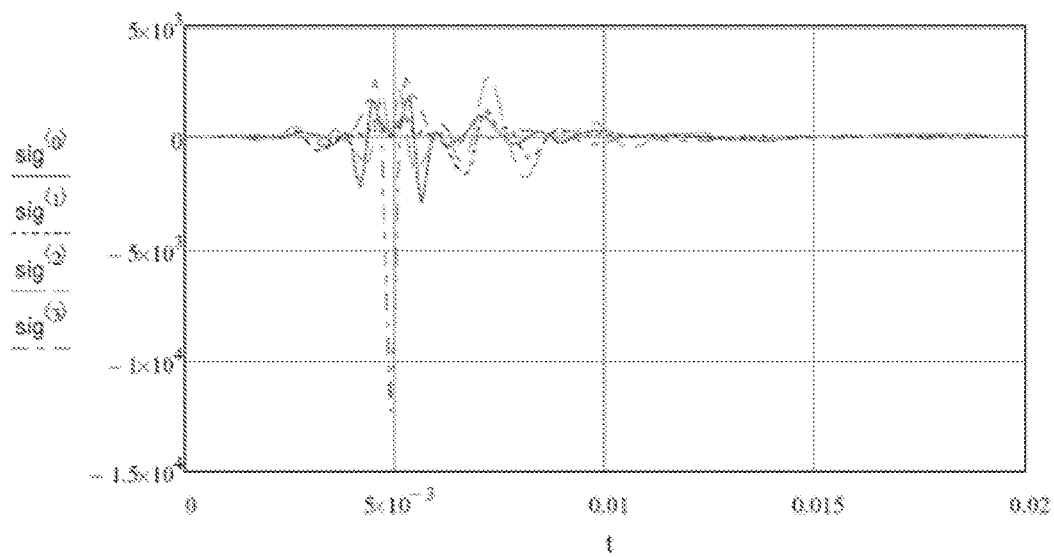
FIGS. 7a to 7c show the output signals at the touch point resulting from of using different snapshot lengths (5 ms, 7.5 ms and 10 ms) to create the time reversal filters.
Figure 7B:
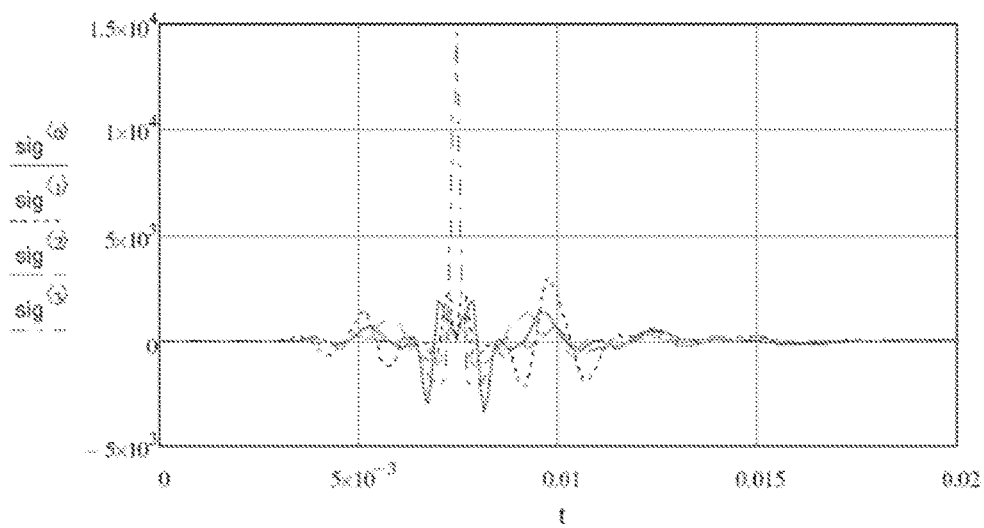
Figure 7C:
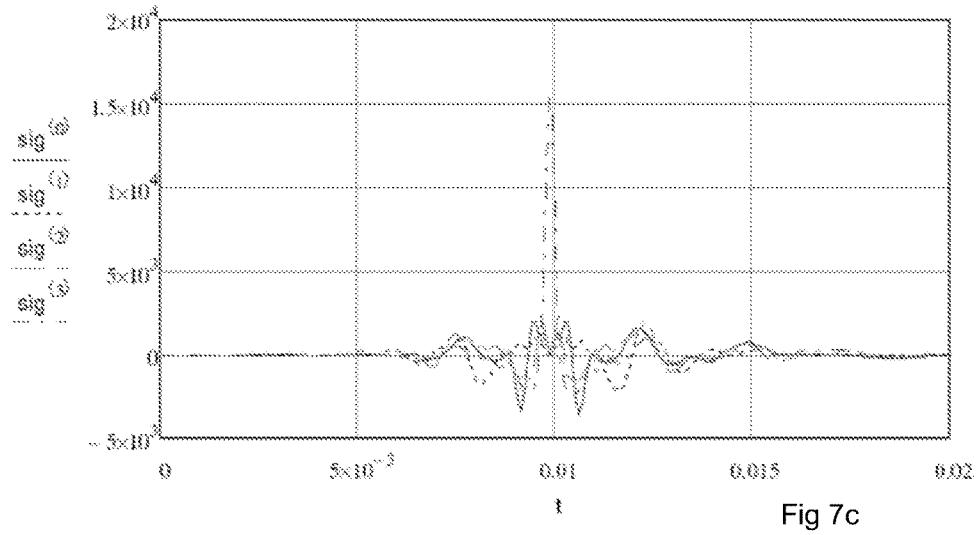

FIGS. 7a and 8a show the results of using a filter formed using a snapshot of 5 ms; FIGS. 7b and 8b show the results of using a filter formed using a snapshot of 5 ms; and FIGS. 7c and 8c show the results of using a filter formed using a snapshot of 10 ms. FIGS. 7a to 7c use a method of principle component analysis (PCA) which focuses on just the peak amplitude of each GYresp. The detailed equations are set out below:

$n := 0 \ldots 3$ $$M_{j,n} := \frac{1}{4} \cdot \frac{amp_j \cdot amp_n}{\text{mean}(amp)^2}$$

$$M = \begin{pmatrix} 0.329 & 0.26 & 0.334 & 0.224 \\ 0.26 & 0.205 & 0.264 & 0.177 \\ 0.334 & 0.264 & 0.339 & 0.228 \\ 0.224 & 0.177 & 0.228 & 0.153 \end{pmatrix}$$

$\lambda := \text{eigenvals}(M)$ $E := \text{submatrix}(rsort(\text{stack}(\lambda^T \cdot \text{eigenvecs}(M),0),1,4,0,3).$ $$\text{sort}(\lambda) = \begin{pmatrix} 0 \\ 0 \\ 0 \\ 1.026 \end{pmatrix}$$

$$E = \begin{pmatrix} -0.825 & -0.072 & -0.052 & -0.566 \\ 0.307 & 0.667 & -0.252 & -0.447 \\ 0.395 & -0.666 & -0.356 & -0.575 \\ 0.265 & 0.326 & 0.898 & -0.386 \end{pmatrix}$$

$$sig^{(n)} := \sum_j (E_{j,n} \cdot GYresp^{(j)})$$

For each of the signals of FIGS. 7a to 8c, normalisation with respect to sig$^{<3>}$ is carried out using $$pwr_n := sig^{(n)} \cdot sig^{(n)}$$

$$pwr_n := \frac{pwr_n}{pwr_3}$$

Where $pwr_n$ is a vector of the summed power in each processed signal n.

The following values are then calculated for each variation:

$$pwr^T, \Sigma[\overrightarrow{(10 \cdot \log(\overrightarrow{pwr}))}]^T \text{ and } [\overrightarrow{(10 \cdot \log(\overrightarrow{pwr}))}]^T$$

Where $pwr^T$ is the matrix transpose of pwr and the vector 10·log (pwr) is the same information as pwr but in decibel.

For FIG. 7a, these values are:

$$pwr^T = (0.147\ 0.081\ 0.26\ 1)$$

$$\Sigma[\overrightarrow{(10 \cdot \log(\overrightarrow{pwr}))}]^T = -25.075$$
$$[\overrightarrow{(10 \cdot \log(\overrightarrow{pwr}))}]^T = (-8.339 - 10.894 - 5.842\ 0)$$

The maximised channel power is normalised to 1.0, so the other three values represent how much gets through the minimised channels—so a lower value is better.

For FIG. 7b, they are:

$$pwr^T = (0.164\ 0.246\ 0.071\ 1)$$

$$\Sigma[\overrightarrow{(10 \cdot \log(\overrightarrow{pwr}))}]^T = -25.453$$
$$[\overrightarrow{(10 \cdot \log(\overrightarrow{pwr}))}]^T = (-7.84 - 6.088 - 11.495\ 0)$$

For FIG. 7c, they are:

$$pwr^T = (0.172\ 0.11\ 0.135\ 1)$$

$$\Sigma[\overrightarrow{(10 \cdot \log(\overrightarrow{pwr}))}]^T = -25.928$$
$$[\overrightarrow{(10 \cdot \log(\overrightarrow{pwr}))}]^T = (-7.636 - 9.602 - 8.689\ 0)$$

FIGS. 8a to 8c use a method of principle component analysis (PCA) which focuses on the total energy in each GY resp.

$$M_{j,n} := \frac{1}{4} \cdot \frac{GYresp^{(j)} \cdot GYresp^{(n)}}{mean(amp)^2}$$

$$M = \begin{pmatrix} 0.918 & 0.458 & 0.655 & 0.385 \\ 0.458 & 0.432 & 0.48 & 0.303 \\ 0.655 & 0.48 & 0.906 & 0.533 \\ 0.385 & 0.303 & 0.533 & 1.032 \end{pmatrix}$$

$$\lambda := eigenvals(M)$$

$$E := submatrix(rsort(stack(\lambda^T \cdot eigenvecs(M), 0), 1, 4, 0, 3)$$

$$sort(\lambda) = \begin{pmatrix} 0.124 \\ 0.238 \\ 0.642 \\ 2.284 \end{pmatrix}$$

$$E = \begin{pmatrix} -0.198 & -0.664 & -0.479 & -0.538 \\ 0.896 & 0.166 & -0.193 & -0.363 \\ -0.397 & 0.698 & -0.158 & -0.575 \\ 0.019 & -0.21 & 0.841 & -0.498 \end{pmatrix}$$

$$sig^{(n)} := \sum_j (E_{j,n} \cdot GYresp^{(j)})$$

For FIG. 8a, the values are:

$$pwr^T = (0.054\ 0.104\ 0.281\ 1)$$

$$\Sigma[\overrightarrow{(10 \cdot \log(\overrightarrow{pwr}))}]^T = -27.981$$
$$[\overrightarrow{(10 \cdot \log(\overrightarrow{pwr}))}]^T = (-12.643 - 9.828 - 5.51\ 0)$$

For FIG. 8b, the values are:

$$pwr^T = (0.05\ 0.104\ 0.325\ 1)$$

$$\Sigma[\overrightarrow{(10 \cdot \log(\overrightarrow{pwr}))}]^T = -27.702$$
$$[\overrightarrow{(10 \cdot \log(\overrightarrow{pwr}))}]^T = (-12.991 - 9.826 - 4.885\ 0)$$

For FIG. 8c, the values are:

$$pwr^T = (0.043\ 0.103\ 0.332\ 1)$$

$$\Sigma[\overrightarrow{(10 \cdot \log(\overrightarrow{pwr}))}]^T = -28.272$$
$$[\overrightarrow{(10 \cdot \log(\overrightarrow{pwr}))}]^T = (-13.631 - 9.858 - 4.783\ 0)$$

These results show that longer filters are better, but even the short ones do a reasonable job.

Principle component analysis is a method which is suitable for obtaining the best amplitudes at which to drive each channel. There are other equivalent methods.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of self-calibrating a haptic response of a touch sensitive device configured to generate a desired haptics sensation comprising a touch-sensitive screen; a plurality of transducers mounted to the screen and a processor, the method comprising:
   inputting a signal into the screen at a test position on the screen whereby the screen is excited into vibration;
   detecting vibration in the screen using the plurality of transducers; and
   processing, in the processor of the touch-sensitive device, the vibration detected at each transducer to:
   determine whether the vibration detected by at least one transducer is in-phase or out-of-phase with the vibration detected by at least one other transducer; and
   generate an output signal for each of the plurality of transducers, the output signal calibrated to provide the desired haptics sensation at the test position, the desired haptics sensation ranging from a maximum when the vibration detected by the plurality of transducers are in-phase with one another to a minimum when the vibration detected by the plurality of transducers are out-of-phase with one another;
   whereby, when the plurality of transducers are driven by the output signals, the screen is excited to generate the desired haptics sensation at the test position.

2. A method according to claim 1, wherein the processing comprises processing the detected vibration to measure a transfer function from the input signal to produce vibration for each of the plurality of transducers.

3. A method according to claim 2, wherein the processing comprises inferring an inverse transfer function for each of the plurality of transducers from the measured transfer functions and generating the output signals for each of the plurality of transducers from the associated inverse transfer functions.

4. A method according to claim 3, wherein the inferring comprises directly calculating each inverse transfer function by inverting the transfer function of the input signal.

5. A method according to claim 3, wherein the inferring comprises using feedback adaptive filter techniques to implicitly invert the transfer function of the input signal.

6. A method according to claim 3, wherein the inferring comprises using heuristic methods.

7. A method according to claim 3, comprising storing the inferred inverse transfer functions.

8. A method according to claim 1, wherein the processing comprises generating the output signal by filtering the detected signal using a time-reversed response.

9. A method according to claim 8, wherein the filtering step comprises approximating said time-reversed response by adding a fixed delay which is at least as long as the duration of the detected signal.

10. A method according to claim 9, wherein the fixed delay is at least 5 ms.

11. A method according to claim 9, wherein the fixed delay is at least 10 ms.

12. A method according to claim 8, comprising normalising the detected signal before filtering.

13. A touch sensitive device configured to generate a desired haptics sensation to operate in a use mode or a self-calibration mode, the device comprising:
 a touch-sensitive screen;
 a plurality of transducers mounted to the screen wherein the plurality of transducers are configured, when the device is operating in use mode, to generate an output signal which excites the screen and wherein the plurality of transducers are configured, in calibration mode, to detect vibration in the screen generated by an input signal from a vibration generator contacting the screen at a test position; and
 a processor coupled to the plurality of transducers whereby the processor is configured to process the vibration detected at each transducer to:
 determine whether the vibration detected by at least one transducer is in-phase or out-of-phase with the vibration detected by at least one other transducer; and
 generate an output signal for each of the plurality of transducers, the output signal calibrated to provide the desired haptics sensation at the test position, the desired haptics sensation ranging from a maximum when the vibration detected by the plurality of transducers are in-phase with one another to a minimum when the vibration detected by the plurality of transducers are out-of-phase with one another;
 whereby, in use mode, the plurality of transducers excite the screen to produce the desired haptics sensation to a user contacting the screen at the test position.

14. A touch sensitive device according to claim 13, wherein the plurality of transducers are reciprocal transducers.

15. A touch sensitive device according to claim 14, wherein the processor is configured to process the detected vibration to measure a transfer function of the input signal at each of the plurality of transducers, to infer an inverse transfer function from each measured transfer function, and to generate each output signal using the appropriate inverse transfer function.

16. A method of self-calibrating a haptic response of a touch sensitive device configured to provide the generation of a desired haptics sensation comprising a touch-sensitive screen; a plurality of vibration transducers coupled to the screen; and a signal processor, the arrangement being such that at least some of the plurality of transducers provide haptic feedback to the screen in response to touch, the method comprising:
 inputting a vibrational signal into the screen at a test position on the screen whereby the screen is excited into vibration;
 detecting vibration in the screen using signals from the plurality of transducers in response to the vibrational signal;
 measuring, in the signal processor, the detected signals and determining whether the signal detected by at least one transducer is in-phase or out-of-phase with the signal detected by at least one other transducer, to generate a calibrated output signal for each of the plurality of transducers whereby the transducers are driven by the output signals to excite the screen to generate the desired haptics sensation at the test position, and wherein the output signals are generated by filtering the detected signals by using time inverted copies of the detected signals, the calibrated output signal ranging from a maximum when the signals detected by the at least one and at least one other transducers are in-phase with one another to a minimum when the signals detected by the at least one and the at least one other transducers are out-of-phase with one another.

17. A method according to claim 16, wherein reversing the time response includes adding a fixed delay which is at least as long as the duration of the detected signal.

18. A method according to claim 17, wherein the fixed delay is at least 5 ms.

19. A method according to claim 17, wherein the fixed delay is at least 10 ms.

20. A method according to claim 16, comprising normalising the detected signal before filtering.

21. A method according to claim 17 wherein the fixed delay is at least 7.5 ms.

22. A method according to claim 3, wherein inferring comprises approximating each inverse transfer function by reversing the measured time response of the input signal.

* * * * *